UNITED STATES PATENT OFFICE 2,253,701

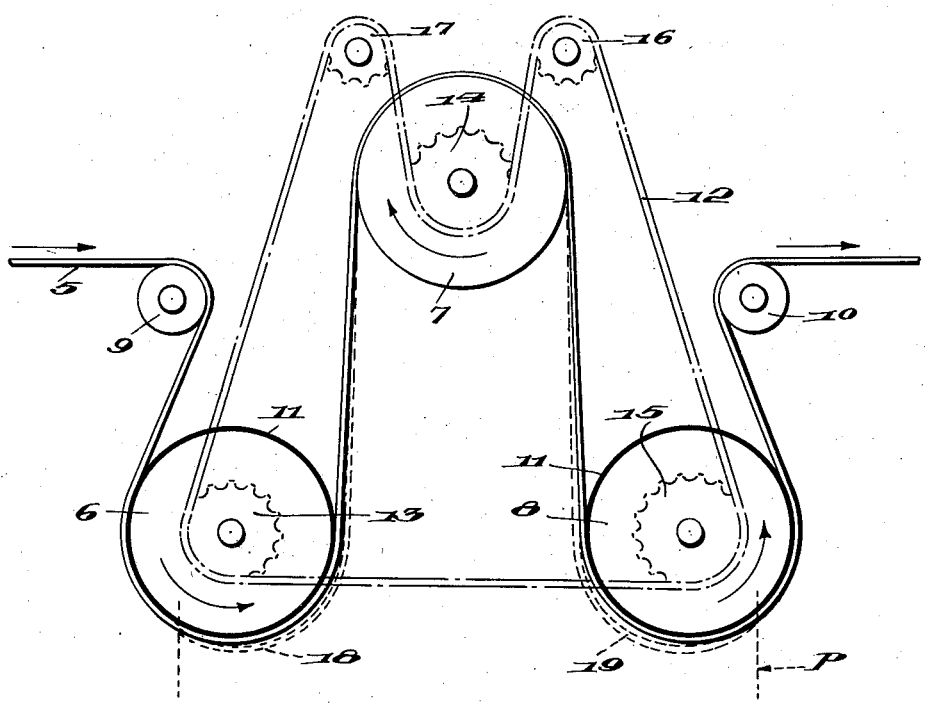

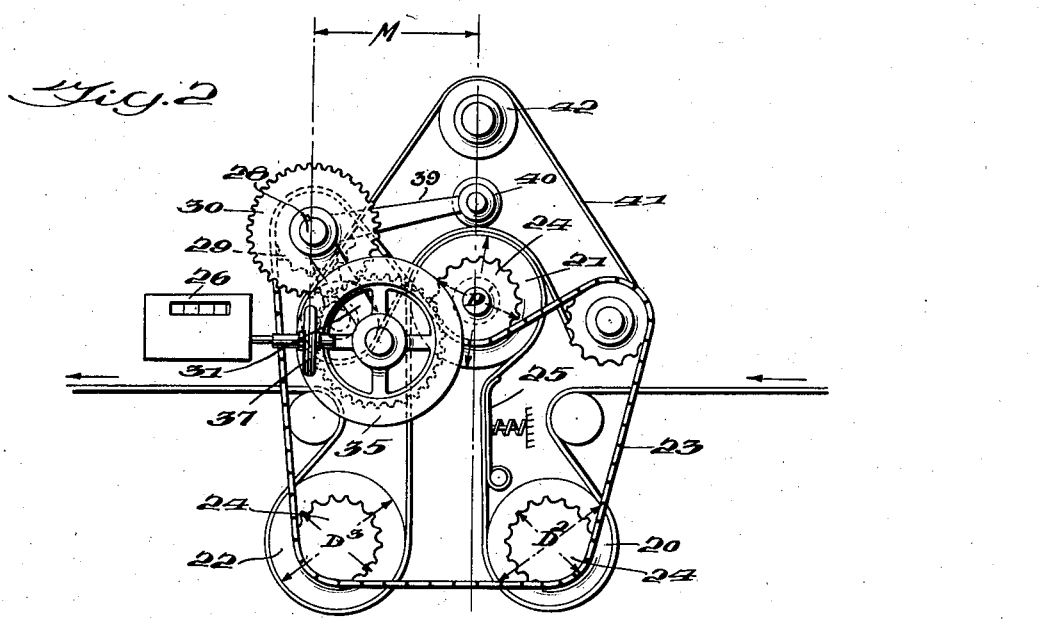
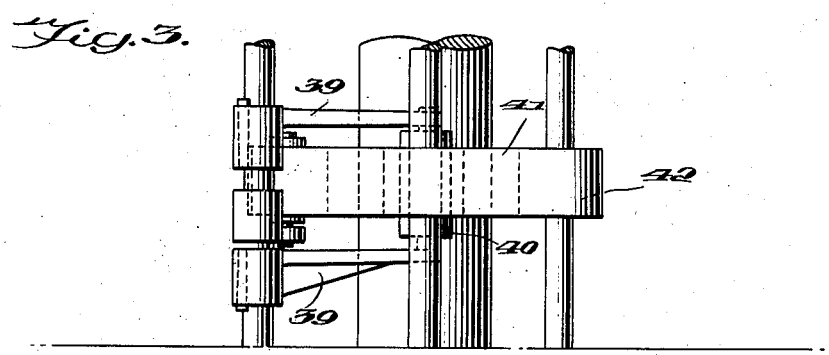
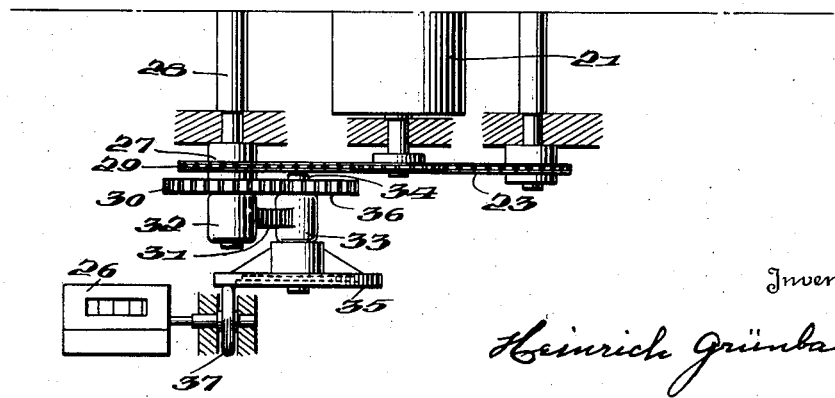

APPARATUS FOR MEASURING THE LENGTH OF STRIP MATERIAL

Heinrich Grünbaum, Berlin-Lankwitz, Germany

Application August 30, 1938, Serial No. 227,549
In Germany June 12, 1936

9 Claims. (Cl. 33—129)

This invention relates to the measurement of the length of flexible materials in strip form, such as textile webs, oil-cloth, felt, carpets, rubber-cloth, wire, cables and the like. For the sake of brevity the following specification and claims refer only to strips or webs of materials, but it is to be understood that the invention relates to measuring the length of all materials such as those above indicated.

One of the most important operations which a calibrated length measuring machine must perform, is the tensionless feeding of the textile web to the measuring position. In many cases the thickness error is also important. It has previously been proposed to effect the loosening of the material before it runs on to the measuring roller by inserting a feed roller, the peripheral speed of which is periodically greater than that of the measuring roller. The condition is thus achieved that more material is fed to the measuring roller than can be carried by the latter, so that a reserve of slack material in the form of a loop is produced. This loop is used to operate a control lever which reduces the speed of the feed roller in relation to the speed of the measuring roller when the loop becomes too large, whereby the loop is reduced until an adjustment in the opposite direction takes place when the loop attains a minimum size. Such constant automatic adjustment necessitates the inclusion of band brakes, magnetic clutch members, separate regulable motors or the like and thus necessarily produces a complicated and expensive machine and creates unavoidable sources of error.

According to the present invention a length measuring machine for textile webs is provided having a feed roller arranged in advance of the measuring roller and driven at such a speed in relation thereto that the peripheral speed of the feed roller is constantly higher than that of the measuring roller by a convenient invariable percentage so arranged with the web of material embracing the feed roller from below that when over-feeding arises between the feed roller and the measuring roller, slipping between the fabric and the feed roller results from the sagging of the fabric web.

More specifically the invention contemplates a length measuring machine in which a feed roller is arranged both in front of and behind the measuring roller and which effects the slack feeding of a web of material to the measuring roller by having the peripheral speed of the first feed roller higher than that of the measuring roller by a convenient invariable percentage and by having the peripheral speed of the second feed roller, lower by a convenient invariable percentage than that of the measuring roller. The material web is passed around the underside of the two feed rollers in such a manner that, when over-feed arises between a roller with a higher speed in relation to one with a lower speed, slipping arises between the web and the feed rollers as a result of the sagging of the textile web.

In some circumstances, however, it is sufficient to slacken the material in advance of the measuring roller only. Instead of the measuring roller referred to herein other conventional measuring devices can be used.

With the length measuring machine according to the present invention it is not necessary to provide any means for variable control of the speed of revolution of the feed or measuring rollers or any kind of pressing or travelling members and it is therefore possible to connect all the rollers, including the measuring roller, in driving engagement with each other with ordinary driving devices such as chains, pinions, pulleys and the like. Since no control is necessary, even compensation devices such as swinging arms, riding rollers and the like, can be obviated, thus achieving very great cheapness and reliability.

The preferred length measuring machine according to the present invention is provided with means for compensating for the error produced due to the thickness of the textile web. That is to say means are provided for correcting the measurement, which would otherwise be indicated or recorded by the turning of the measuring roller, in such a manner that the machine records the length of the neutral zone of the textile or other web.

Tests have shown that when a textile or other web passes over the measuring rollers of length measuring machines, the neutral zone of the web does not lie on either surface of the web, but rather at some point within the thickness of the web. In a great number of cases it has been found that the neutral zone lies approximately two thirds of the way through the thickness of the web, measured from the face of the roller.

The compensation to secure a correct indication of the length of the material measured is preferably effected by means which also form part of the present invention. This means comprises an infinitely variable transmission gear connection between the measuring roller and the recording device, which transmission is controlled by means sensitive to the thickness of the web.

The accompanying drawings illustrate preferred embodiments of the invention. In the drawings:

Figure 1 illustrates diagrammatically a side elevation of a device according to the invention for the slack feeding of a textile web to and to and from a measuring roller, Figure 2 is a semi-diagrammatic side view of a device according to the invention, which includes means for compensating for the thickness error and, Figure 3 is a semi-diagrammatic plan view of the device according to Figure 2, with the web removed.

Referring to Figure 1, 5 indicates a web of material which is fed from a supply roll, not shown, and passes through the group of rollers 6, 7 and 8 in the direction of the arrow to a take-up roll, not shown. In its passage through the measuring device, the web passes over a guide roller 9, then downwardly around the underside of the feed roller 6, then upwardly over the measuring roller 7, then downwardly around the underside of the second feed roller 8, then upwardly over a guide roller 10 to a take up roll, not shown. The rollers 6 and 8 are provided with friction surfaces 11, such as a rubber covering, to increase the frictional engagement between the rollers and the textile web.

The rollers 6, 7 and 8 are connected together in driving engagement by means of an endless chain 12 trained over sprockets 13, 14 and 15, respectively, mounted on the respective roller shafts and over tensioning sprockets 16 and 17 mounted in spaced relation above the roller 7. The sprocket 15 is slightly larger in diameter and has a greater number of teeth than the sprocket 14 and the latter in turn is slightly larger in diameter and has a greater number of teeth than the sprocket 13. The peripheral speed of the feed roller 6 is thus slightly greater than the peripheral speed of the measuring roller 7 and the peripheral speed of the measuring roller is slightly greater than the peripheral speed of the offtake feed roller 8. In the illustrated embodiment, the three rollers are of the same diameter, however, the difference in the peripheral speed could be attained by varying the diameter of the rollers and driving them all at the same shaft speed. The graduation of the peripheral speed need only amount to a few percent. difference in speed between the respective rollers to attain the feed according to the invention. As an example of a satisfactory percentage difference of linear speeds, if the measuring roller is driven at a linear speed of 100, the feed roller in advance thereof should be driven at a speed of 105 and the feed roller following the measuring roller at a speed of 95.

The textile web is fed from a supply roller (not shown) on the left hand side of Figure 1 to a take-up roller (also not shown) on the right hand side of Figure 1. The supply roller is fitted with a slipping brake mechanism or other known means for maintaining a suitable tension on the web. The take-up roller is driven from a suitable source of power and in many cases this drive suffices for all the operations involved in measuring because the tension produced in the textile web by the take-up drive is sufficient to draw it through the device, and thus operate the measuring device through the chain 12 connecting all the rollers.

The operation of the device shown in Figure 1 is as follows:

Since the roller 6 feeds more material than the measuring roller 7 can carry away the web of material forms a small sagging loop portion 18, as indicated in dotted lines, under the roller 6 due to its own weight. As a result of this however the feed by the roller 6 temporarily ceases, because the looped portion 18 of the textile web is out of contact with the roller, thus lessening the frictional pull of the roller on the web to such an extent that it cannot draw the web against the resistance set up by the supply roller brake mechanism.

That portion of the web between the roller 6 and the measuring roller 7, will, however, be taken up by the measuring roller as a result of the continued operation of the latter. This take up by the roller 7 reduces the size of the loop 18 and causes the web to be brought into engagement with a greater part of the roller 6, until the frictional pull of this roller increases to such an extent that it can again draw material from the supply roller.

The result of the measuring roller 7 feeding more material than the roller 8 can carry away is to form a sagging loop portion 19 below the roller 8 as in the case of roller 6 just described. This, as in the case of roller 6, lessens the frictional drag exerted by the roller 8 on the web until this is reduced to such an extent that the tension produced by the take-up roller drive (extending to P, the point of separation between the web when looped and the roller 8) overcomes it and draws up the slack below the roller 8, the web slipping on the roller due to the reduced area of contact between the two. When this slack is taken up and the web is drawn into contact with the roller 8, the frictional pull exerted by the roller increases until it is such that the take-up roller drive cannot slip the web over the roller surface. The roller 8 is again driven by the web and the other rollers are likewise rotated through the chain drive, thus the tension produced by this drive is prevented from reaching the measuring roller 7.

It will thus be seen that it is impossible for the web about the measuring roller to be tensioned either in advance of or behind the same because either the roller 6 feeds the material at a higher rate than it can be carried away, or the web sags down; in both cases, therefore, the material fed is in a slack condition. The same also holds for the operation of the roller 8; either the material lies on the roller and is then drawn away at a lesser speed than the measuring roller feeds it, or it sags down, and is therefore slack in each case.

In other words the general tension which would otherwise exist in the textile web between the supply and take-up rollers is taken up by the chain 12 between the rollers 6 and 8.

From the foregoing it will be appreciated that it is necessary for the frictional engagement between the rollers 6 and 8 and the textile web to be so related to the tension produced by the supply roller braking device and the take-up roller drive, respectively, that it is overcome by the corresponding tension at its minimum and resists the corresponding tension at its maximum.

In the case of some material, particularly delicate fabrics or rubber cloth, it is undesirable to pull them through the measuring machine by means of the take-up roller drive. When measuring such fabrics it is therefore desirable to drive the measuring machine independently of the take-up roller. For this purpose the arrangement described above is modified by the provision of means for driving the chain 12, preferably a motor on the shaft of one of the tensioning pulleys 16 or 17, and of a slipping clutch or like device in the take-up roller drive. This device must be such that the take-up roller drive slips when the web is fully engaged around the roller 8 and such that it drives when the web sags away from the roller. The rollers 6, 7, and 8 may be individually driven if desired.

The indicated steps, namely the over-feeding, sagging down and subsequent carrying away of the material web, are imperceptible to the eye. In appearance there occurs only the result of these three processes, namely a constant slipping of the material web under the rollers 6 and 8 with complete slackness of that part of the material lying between these rollers and passing over the measuring roller.

Naturally the roller 8 may be dispensed with when it is considered sufficient only to slacken the material in advance of the measuring roller. In such cases behind the measuring roller there can then be used, as in nearly all length measuring machines on the market, an ordinary contact roller rotating with the same speed as the measuring roller.

The invention is also applicable when in place of the measuring roller 7, any other measuring member, for example an endless band, a pair of rollers or the like, is used, a measuring roller being shown merely by way of example.

It is important that on the slack sides, the area of contact of the web with the two feed rollers does not extend above the lower half of the rollers, i. e. that the slack textile web in the extreme case approaches the feed roller substantially tangentially or vertically from above. Otherwise the case might arise wherein during the operation, the material entirely surrounds the roller 6 or lies upon the roller 8 in folds. The passing of the web to and around beneath the rollers must constantly take place in such a manner that when over-feed occurs, the web can sag down, thereby producing a slippage between the textile web and the feed rollers.

Reference is made to the embodiment of the invention shown in Figures 2 and 3 for the description of the means for compensating for the thickness error arising in measuring machines of this general type. The material web of the thickness $\delta$ is led over the feed roller 20, then over the measuring roller 21 and finally over the feed roller 22. These three rollers of which the diameters are $D_2$, $D_1$, and $D_3$ respectively are graduated decreasingly in the above sequence and are connected in driving engagement with each other by a chain 23 with the aid of chain sprockets 24, all of the same size, on the respective roller shafts. Thus in the manner described in connection with Figure 1, a non-deforming slack run of the web on either side of the measuring roller is ensured. The device is so constructed that with the aid of a spring pressed guide member 25, engaging the web the greatest possible spanning angle is produced over the measuring roller for the purpose of ensuring freedom from slip between the measuring roller and the web.

The turning movement of the measuring roller is transmitted to a counter or other measurement indicating device 26 in the following manner: The same chain 23, which also connects the measuring roller 21 with the feed rollers 20 and 22, also drives a sleeve 27 journalled on a rock shaft 28 by means of a sprocket 29 of the same size as the other sprockets 24. The sleeve 27 carries a gear 30.

The rock shaft 28, at the same end as that at which the sleeve 27 with the gear 30 is situated, carries an arm 31 which is keyed thereto at one end 32. The other end 33 of the arm 31 mounts a spindle 34 having a friction disc 35 keyed on one end thereof. A gear 36 is keyed on the other end of the spindle 34 and is in mesh with the gear 30 on the sleeve 27. The gears 30 and 36 are of the same size. In the arrangement described the friction wheel disc 35 makes exactly the same number of revolutions as the measuring roller 21 because both members are connected together by a 1:1 transmission.

A friction wheel 37 journalled at right angles thereto bears against the friction disc 35 and drives the counter 26 direct. An infinitely variable gearing is thus provided which includes the friction disc 35 and the friction wheel 37, whereby the ratio of the transmission between the measuring roller and counter can be varied as follows: On the rock shaft 28, about in the middle of the length of the measuring roller, a pair of arms 39 is keyed, which, for example, carry a roller 40, journalled between the free ends thereof. This roller can either bear directly on the web passing over the measuring roller or can bear on a belt 41 which runs on the web to avoid pressure marks. The belt 41, which is conveniently guided over three rollers 42, as shown in Figure 2, also has as large as possible a spanning angle over the measuring roller. The effective length of the arms 39 is indicated by M (Figure 2).

According to the thickness $\delta$ of the material being measured, the roller 40 falls or rises and turns the rock shaft 28 in one or the other direction. A corresponding swinging movement is then also executed by the arm 31 which carries the friction disc 35. Thus the point of engagement of the friction wheel 37 with the friction wheel disc 35 is displaced by a definitely determined amount toward or away from the axis of the disc 35. This amount depends upon the relation between the length of the arms 39 and the length of the arm 31. If the arrangement is so made that the two lengths are as 3:2, then, when the roller 40 rises or falls by the amount $\delta$, the displacement of the engagement point of the friction wheel 35 amounts to $\tfrac{2}{3}\delta$. The annular friction surface of the disc 35 must be chosen of such a size that the smallest friction diameter available is somewhat smaller than the diameter of the measuring roller, whereas the largest diameter takes into consideration the greatest possible practical thickness of material to be measured. The machine is so adjusted that with a material thickness equal to 0, i. e. when the belt 44 lies directly upon the measuring roller, the friction wheel 37 engages upon that diameter of the disc 35 which exactly corresponds to the diameter of the measuring roller.

As can be seen, with this construction, there is an absolutely positive connection ensured between the engaging radius on the wheel 35 and the thickness of the material. Furthermore, it is ensured that the metre-counter measures the length corresponding to the diameter $D_1$ of the measuring roller plus $\tfrac{2}{3}\delta$; therefore, the length of the neutral zone of the material is determined in each case.

It will be evident that the invention does not necessarily require the infinitely variable gear to be of the particular kind described. Thus for example the transmission between the measuring roller and the friction disc 35 can be otherwise arranged by suitable choice of the transmission ratio for the arms 39 and 31.

The device for compensating the thickness error may also be employed without the tensionless feed device, for instance for the measuring of cables.

Other modifications in the details of construction and mode of operation may be resorted to without departing from the spirit of the invention within the scope of the appended claims.

I claim:

1. In a machine for measuring the length of a flexible strip of material including a measuring device adapted to continuously receive and deliver a strip, a feed roller in advance of said measuring device for feeding the strip to the same and a feed roller behind said measuring device for feeding the strip away from the same, said feed rollers being positioned in relation to the measuring device so that with the strip passing in frictional feeding engagement around the underside thereof the points at which said strip leaves and meets said rollers, respectively, are below the points at which the strip is received and delivered by the measuring device, means for constantly driving the feed roller in advance of the measuring device at a peripheral speed greater than the rate of passage of the strip through the measuring device and for driving the feed roller behind said measuring device at a peripheral speed less than the rate of passage of the strip through the measuring device whereby upon overfeed between the measuring device and either of the feed rollers slipping occurs between the strip and the respective feed rollers due to sagging of the strip away from the surface thereof.

2. In a machine for measuring the length of a flexible strip of material including a measuring roller over which the strip passes, a feed roller in advance of the measuring roller for feeding the strip to the same and a feed roller behind the measuring roller for feeding the strip away from the same, said feed rollers being positioned in relation to said measuring roller so that with the strip passing in frictional feeding engagement around the under side thereof the points at which the strip leaves and meets the feed rollers are below the points at which the strip meets and leaves the measuring roller, respectively, means for driving the feed roller in advance of the measuring roller at a peripheral speed slightly greater than the peripheral speed of the measuring roller and for driving the feed roller behind the measuring roller at a peripheral speed slightly less than the peripheral speed of the measuring roller whereby upon overfeed between the measuring roller and either of the feed rollers, slipping occurs between the strip and the respective feed rollers due to sagging of the strip away from the surface thereof.

3. In a machine for measuring the length of strip material, a measuring roller over which the material passes in the measuring operation, a friction disc driven at the same angular speed as the measuring roller, a rocker arm supporting said friction disc, a friction wheel peripherally engaging the surface of said friction disc and driven thereby, a counter driven by said friction wheel, and a riding lever arm rigid with said rocker arm and having a part bearing on the material passing over said measuring roller, whereby the rise and fall of said riding lever due to variation in the thickness of material passing over said measuring roller actuates said rocker arm to shift said friction disc with relation to said friction wheel and thereby vary the driving ratio between said measuring roller and said counter.

4. In a machine for measuring the length of strip material, a measuring roller over which the material passes in the measuring operation, a friction disc driven at the same angular speed as the measuring roller, a rocker arm supporting said friction disc, a friction wheel peripherally engaging the surface of said friction disc and driven thereby, a counter driven by said friction wheel, and a riding lever arm rigid with said rocker arm and having a part bearing on the material passing over said measuring roller, whereby the rise and fall of said riding lever due to variation in the thickness of material passing over said measuring roller actuates said rocker arm to shift said friction disc with relation to said friction wheel and thereby vary the driving ratio between said measuring roller and said counter, the length relationship of said riding arm and said rocker arm being such that said friction wheel always engages said friction disc at a radial point corresponding to the radius of said measuring roller plus the distance of the neutral zone of the material being measured from the surface of the measuring roller.

5. In a machine for measuring the length of strip material, a measuring roller over which the material passes in the measuring operation, a friction disc driven at the same angular speed as the measuring roller, a rocker arm supporting said friction disc, a friction wheel peripherally engaging the surface of said friction disc and driven thereby, a counter driven by said friction wheel, and a riding lever arm rigid with said rocker arm and having a part bearing on the material passing over said measuring roller, whereby the rise and fall of said riding lever due to variation in the thickness of material passing over said measuring roller actuates said rocker arm to shift said friction disc with relation to said friction wheel and thereby vary the driving ratio between said measuring roller and said counter, the length relationship of said riding arm and said rocker arm being such that said friction wheel always engages a point on said friction disc radially spaced from the axis thereof corresponding to the radius of said measuring roller plus the distance required to compensate for error in the counter total occasioned by the distance of the neutral zone of the material from the roller engaging face thereof.

6. In a machine for measuring the length of a flexible strip of material including a measuring device adapted to continuously receive and deliver a strip, a feed roller in advance of said measuring device for feeding the strip to the same and a feed roller behind said measuring device for feeding the strip away from the same, said feed rollers being positioned at a lower level than said measuring device and with the strip passing in frictional feeding engagement around the underside thereof, means for driving the feed roller in advance of the measuring device constantly at a peripheral speed greater than the rate of passage of the strip through the measuring device and for driving the feed roller behind said measuring device at a peripheral speed less than the rate of passage of the strip through the measuring device, whereby upon overfeed between the measuring device and either of the feed rollers, slipping occurs between the strip and the respective feed rollers due to sagging of the strip away from the surface thereof.

7. In a machine for measuring the length of a flexible strip of material including a measuring roller over which the strip passes, a feed roller in advance of the measuring roller for feeding the strip to the same and a feed roller behind the measuring roller for feeding the strip away from the same, said feed rollers being positioned at a lower level than said measuring roller and with the strip passing in frictional feeding engagement around the underside thereof, means for driving the feed roller in advance of the measuring roller at a peripheral speed slightly greater than the peripheral speed of the measuring roller and for driving the feed roller behind the measuring roller at a peripheral speed slightly less than the peripheral speed of the measuring roller, whereby upon overfeed between the measuring roller and either of the feed rollers, slipping occurs between the strip and the respective feed rollers due to sagging of the strip away from the surface thereof.

8. In a machine for measuring the length of a flexible strip of material, the combination with a supply roller having means associated therewith for maintaining a tension on the portion of the strip adjacent thereto and a driven take up roller, of a measuring roller over which the strip passes in its travel from the supply to the measuring roller, a feed roller in advance of the measuring roller for feeding the strip from the supply roller to the measuring roller, a feed roller behind the measuring roller for feeding the strip from the measuring roller to the take-up roller, said feed rollers being positioned with the strip passing in frictional feeding engagement around the underside thereof and in relation to the measuring roller so that the strip in passing between the measuring roller and the feed rollers makes contact with the measuring roller at a point above the point at which it leaves and meets the respective feed rollers, a shaft for each of said rollers, means for driving the feed roller in advance of the measuring roller at a peripheral speed slightly greater than the peripheral speed of the measuring roller and for driving the feed roller behind the measuring roller at a peripheral speed slightly less than the peripheral speed of the measuring roller, said driving means including sprocket wheels fixed on the shafts of the feed rollers and measuring roller, respectively, and a sprocket chain connecting said sprocket wheels, whereby upon overfeed between the measuring roller and either of the feed rollers, slipping occurs between the strip and the respective feed rollers due to the sagging of the strip away from the surface thereof.

9. In a machine for measuring the length of a flexible strip of material including a measuring roller over which the strip passes, a feed roller in advance of the measuring roller for feeding the strip to the same and a feed roller behind the measuring roller for feeding the strip away from the same, common driving means for both said feed rollers and said measuring roller, said strip passing around the underside of said feed rollers and said feed rollers being positioned with relation to said measuring roller so that the points at which the strip leaves and meets said feed rollers are below the points at which the strip meets and leaves the measuring roller, respectively, and said feed roller in advance of the measuring roller being driven by said driving means at a peripheral speed slightly greater than the peripheral speed of the measuring roller and the feed roller behind the measuring roller being driven by said driving means at a peripheral speed slightly less than the peripheral speed of the measuring roller, whereby upon over-feed between the measuring roller and either of the feed rollers, slipping occurs temporarily between the strip and the respective feed rollers due to sagging of the strip away from the surface thereof, counter mechanism, an infinitely variable ratio driving means between said measuring roller and said counter mechanism, and means responsive to the thickness of the strip passing over said measuring roller for adjusting the ratio of said variable ratio driving means.

HEINRICH GRÜNBAUM.